US 8,249,004 B2

(12) United States Patent
Wang et al.

(10) Patent No.: US 8,249,004 B2
(45) Date of Patent: Aug. 21, 2012

(54) COORDINATED UPLINK TRANSMISSION IN LTE DRX OPERATIONS FOR A WIRELESS TRANSMIT RECEIVE UNIT

(75) Inventors: Jin Wang, Central Islip, NY (US); Guodong Zhang, Syosset, NY (US); Ulises Olvera-Hernandez, Kirkland (CA)

(73) Assignee: InterDigital Patent Holdings, Inc., Wilmington, DE (US)

( * ) Notice: Subject to any disclaimer, the term of this patent is extended or adjusted under 35 U.S.C. 154(b) by 590 days.

(21) Appl. No.: 12/403,169

(22) Filed: Mar. 12, 2009

(65) Prior Publication Data
US 2009/0232118 A1    Sep. 17, 2009

Related U.S. Application Data

(60) Provisional application No. 61/036,527, filed on Mar. 14, 2008.

(51) Int. Cl.
*H04W 4/00* (2009.01)
(52) U.S. Cl. ........................... 370/329; 370/338
(58) Field of Classification Search .................. 370/329, 370/338, 352
See application file for complete search history.

(56) References Cited

U.S. PATENT DOCUMENTS

| | | | | |
|---|---|---|---|---|
| 2007/0230394 A1* | 10/2007 | Wang et al. | .................... | 370/328 |
| 2007/0287468 A1* | 12/2007 | Jeong et al. | ............... | 455/452.2 |
| 2007/0291728 A1 | 12/2007 | Dalsgaard et al. | | |
| 2008/0160918 A1* | 7/2008 | Jeong et al. | ................. | 455/67.11 |
| 2008/0186892 A1* | 8/2008 | Damnjanovic | ................ | 370/311 |
| 2008/0186944 A1* | 8/2008 | Suzuki et al. | .................. | 370/349 |
| 2008/0268863 A1* | 10/2008 | Pedersen et al. | ............. | 455/452.2 |
| 2009/0073907 A1* | 3/2009 | Cai | .............................. | 370/311 |
| 2009/0175186 A1* | 7/2009 | Du et al. | ........................ | 370/252 |
| 2009/0233653 A1* | 9/2009 | Kim et al. | ...................... | 455/574 |
| 2009/0239566 A1* | 9/2009 | Pelletier et al. | ................ | 455/517 |
| 2009/0303951 A1* | 12/2009 | Lunttila et al. | ................. | 370/329 |
| 2011/0038277 A1* | 2/2011 | Hu et al. | ........................ | 370/252 |

FOREIGN PATENT DOCUMENTS

| | | |
|---|---|---|
| EP | 1 841 249 | 10/2007 |
| WO | 2006/114710 | 11/2006 |
| WO | 2007/148175 | 12/2007 |

OTHER PUBLICATIONS

Nokia Corporation et al., "Clarification on RRC-Connected Mode DRX", 3GPP TSG-RAN WG2 Meeting #61, R2-081168, (Sorrento, Italy, Feb. 11-15, 2008).
Samsung, "Open Issues of DRX", 3GPP TSG-RAN2 Meeting #60 bis, Tdoc R2-080165, (Sevilla, Spain, Jan. 14-18, 2008).

(Continued)

*Primary Examiner* — Chi Pham
*Assistant Examiner* — Farah Faroul
(74) *Attorney, Agent, or Firm* — Condo Roccia LLP

(57) ABSTRACT

A method and apparatus for discontinuous reception (DRX) operation in a wireless transmit receive unit aligns uplink and downlink transmissions with a DRX cycle. The transmission may be a channel quality indicator report, a sounding reference signal, or a silence descriptor among other downlink and uplink transmissions.

16 Claims, 8 Drawing Sheets

OTHER PUBLICATIONS

Third Generation Partnership Project, "Technical Specification Group Radio Access Network; Evolved Universal Terrestrial Radio Access (E-UTRA) and Evolved Universal Terrestrial Radio Access network (E-UTRAN); Overall Description; Stage 2 (Release 8)", 3GPP TS 36.300, V8.3.0, (Dec. 2007).

Third Generation Partnership Project, "Technical Specification Group Radio Access Network; Evolved Universal Terrestrial Radio Access (E-UTRA) and Evolved Universal Terrestrial Radio Access network (E-UTRAN); Overall Description; Stage 2 (Release 8)", 3GPP TS 36.300, V8.7.0, (Dec. 2008).

Third Generation Partnership Project, "Technical Specification Group Radio Access Network; Evolved Universal Terrestrial Radio Access (E-UTRA) Medium Access Control (MAC) Protocol Specification (Release 8)", 3GPP TS 36.321, V8.0.0, (Dec. 2007).

Third Generation Partnership Project, "Technical Specification Group Radio Access Network; Evolved Universal Terrestrial Radio Access (E-UTRA) Medium Access Control (MAC) Protocol Specification (Release 8)", 3GPP TS 36.321, V8.4.0, (Dec. 2008).

Ericsson, "DRX and DTX in LTE_Active," TSG-RAN WG2 Meeting #52, R2-060967 (Mar. 27-31, 2006).

Ericsson, "DRx and VoIP," TSG-RAN WG2 Meeting #59, R2-073208 (Aug. 20-24, 2007).

LG Electronics et al., "DRX Scheme," 3GPP TSG-RAN WG2 #56, R2-063248 (Nov. 6-10, 2006).

Nokia, "DRX parameters in LTE," 3GPP TSG-RAN WG2 Meeting #57bis, R2-071285 (Mar. 26-30, 2007).

QUALCOMME Europe, "Paging for LTE," 3GPP TSG-RAN WG 2 meeting #53, R2-061200 (May 8-12, 2006).

Sharp, "DRX control for VoIP in LTE," 3GPP TSG-RAN WG2#59, R2-073582 (Aug. 20-24, 2007).

\* cited by examiner

COORDINATED UPLINK TRANSMISSION IN LTE DRX OPERATIONS FOR A WIRELESS TRANSMIT RECEIVE UNIT

CROSS REFERENCE TO RELATED APPLICATIONS

This application claims the benefit of U.S. provisional application No. 61/036,527 filed on Mar. 14, 2008, which is incorporated by reference as if fully set forth.

FIELD OF INVENTION

This application is related to wireless communications.

BACKGROUND

In the Third Generation Partnership Project (3GPP), discontinuous reception (DRX) is used between the network and a User Equipment (UE) to save the power of the UE. The UE may be configured by a radio resource control/media access control (RRC/MAC) with a DRX functionality that allows it to stop monitoring the packet data control channel (PDCCH) for a period of time (i.e., a sleep period). The DRX functionality consists of a long DRX cycle, a DRX inactivity timer, and a DRX retransmission timer. The DRX functionality optionally includes a short DRX cycle and a DRX short cycle timer, which are all defined in the 3GPP specification. The long DRX cycle provides a longer sleep period for the UE than does the short DRX cycle. For example, a long DRX cycle may be 160 ms, while a short DRX cycle may be 80 ms.

The active time period is defined as the time period that the UE is awake. When DRX is configured by higher layer, this includes the on duration, the time the UE is continuously monitoring the physical downlink control channel (PDCCH) while the DRX inactivity timer has not expired, and the time that the UE is continuously monitoring the PDCCH while a DRX retransmission timer is running.

As shown in FIG. 1, the DRX cycle specifies the periodic repetition of the on duration followed by a possible period of inactivity. The DRX inactivity timer specifies the number of consecutive transmission time intervals (TTIs) during which the UE monitors the PDCCH after successfully decoding a PDCCH transmission which indicates an initial uplink or downlink user data transmission for the UE. This DRX inactivity timer is restarted if a new PDCCH transmission is detected while the timer is still running. Expiration of the DRX inactivity timer indicates that a particular duration of inactivity has elapsed for receiving any PDCCH transmission. The DRX retransmission timer specifies the maximum number of consecutive TTIs the UE monitors the PDCCH when a downlink retransmission is expected by the UE. The DRX short cycle timer specifies a number of consecutive TTIs that the UE shall follow the short DRX cycle after the DRX inactivity timer has expired. The hybrid automatic repeat-request (HARQ) round-trip time (RTT) timer specifies the minimum amount of TTIs before a downlink HARQ retransmission is expected by the UE. The DRX on duration timer specifies the number of consecutive TTIs during which the UE monitors the PDCCH for possible allocations. The DRX on duration is a part of a DRX cycle.

As mentioned above, the UE may be configured by the RRC/MAC with a DRX functionality that allows it to stop monitoring PDCCH during some period of time. Regardless of whether the UE is monitoring PDCCH, the UE receives and transmits HARQ feedback when such is expected.

FIG. 2 illustrates an example DRX cycle timing diagram for demonstrating the interworking of the various DRX timers during the selection of a short DRX cycle or a long DRX cycle. As shown in FIG. 2, an initial DRX inactivity timer start 201 can occur during any subframe or TTI within the DRX on duration. The DRX inactivity timer duration 202 is fixed. An initial start of the first DRX inactivity timer occurs at 201, with any number of DRX inactivity timer restarts 203 as may be required. The DRX short cycle timer may be configured to start when the DRX inactivity timer expires.

SUMMARY

A method and apparatus are disclosed for a wireless transmit/receive unit (WTRU) behavior during discontinuous reception (DRX) operations related to channel quality indicator (CQI) and sounding reference symbol (SRS) transmissions. In another embodiment, a method and apparatus are disclosed for a WTRU behavior during uplink and downlink VoIP silent periods in DRX operation.

BRIEF DESCRIPTION OF THE DRAWINGS

A more detailed understanding may be had from the following description, given by way of example in conjunction with the accompanying drawings wherein.

DETAILED DESCRIPTION

When referred to hereafter, the terminology "wireless transmit/receive unit (WTRU)" includes but is not limited to a user equipment (UE), a mobile station, a fixed or mobile subscriber unit, a pager, a cellular telephone, a personal digital assistant (PDA), a computer, or any other type of user device capable of operating in a wireless environment. When referred to hereafter, the terminology "base station" includes but is not limited to a Node-B, an evolved Node-B (eNB), a site controller, an access point (AP), or any other type of interfacing device capable of operating in a wireless environment.

Figure 1:
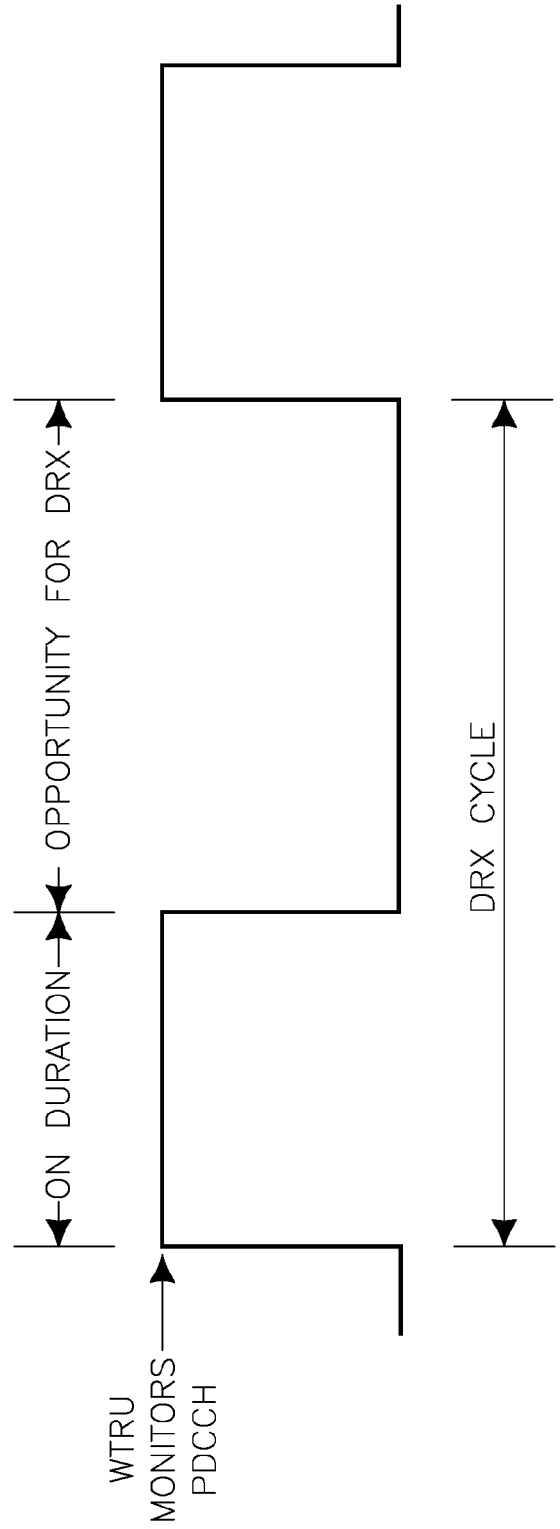
FIG. 1 shows a DRX cycle in accordance with the prior art.
Figure 2:
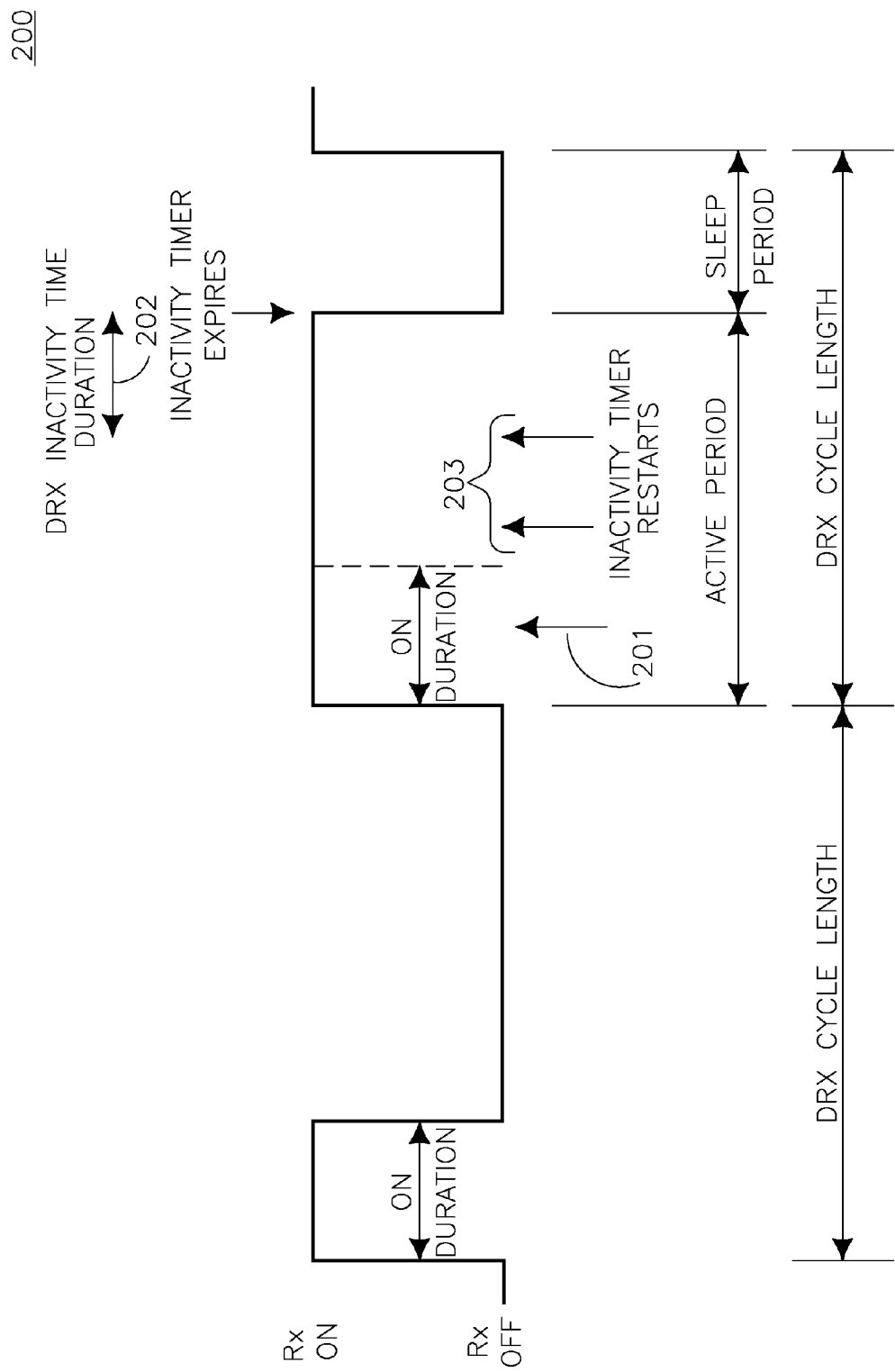
FIG. 2 shows a relationship between several DRX timers in accordance with the prior art.
Figure 3:
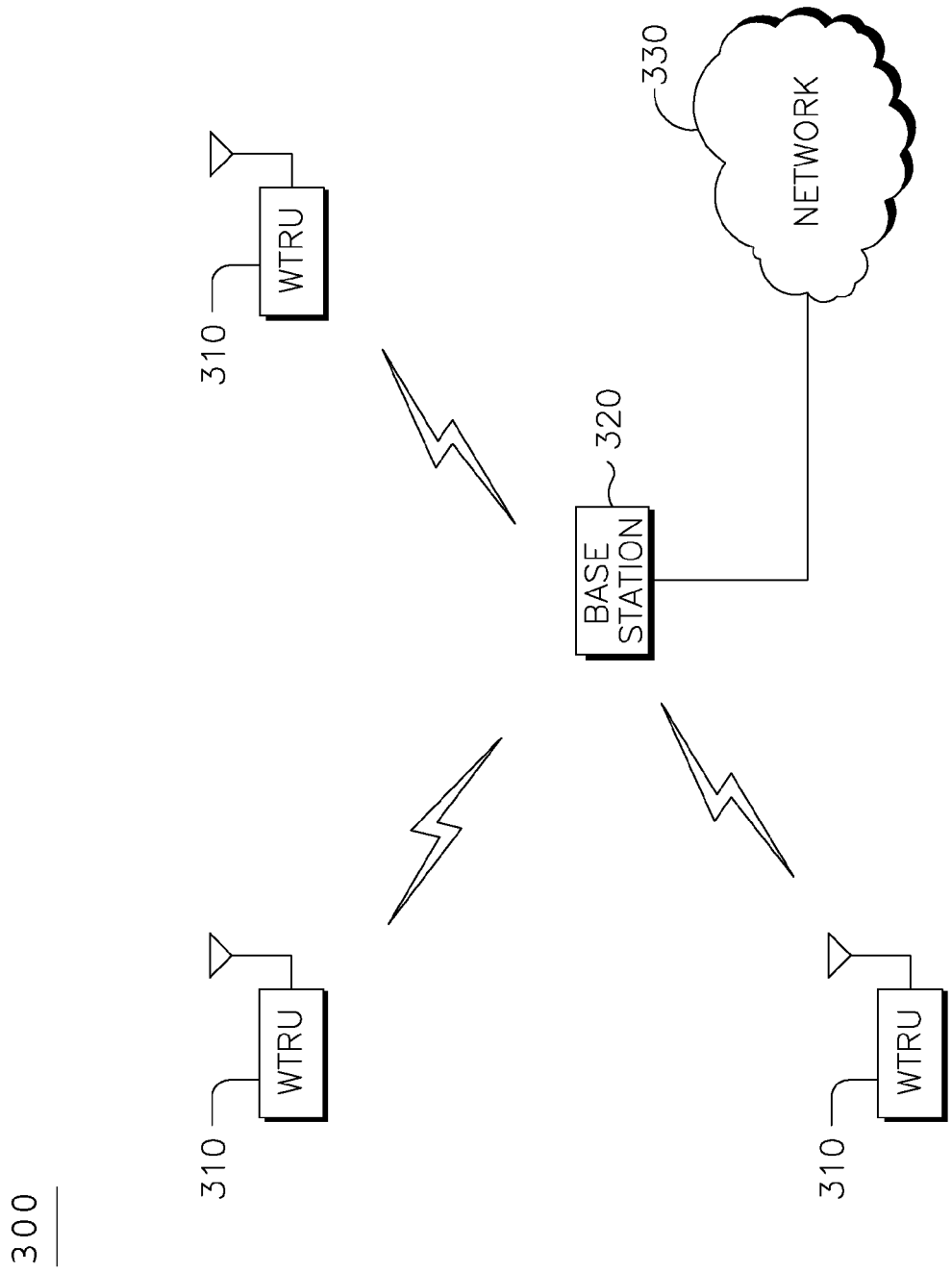
FIG. 3 shows an example wireless communication system including a plurality of wireless transmit/receive units (WTRUs) and a base station.

FIG. 3 shows a wireless communication system 300 including a plurality of WTRUs 310, and a base station 320. As shown in FIG. 3, the WTRUs 310 are in communication with the base station 320, and the base station 320 is in communication with a network 330. Although three WTRUs 310 and base station 320 are shown in FIG. 3, it should be noted that any combination of these wireless devices may be included in the wireless communication system 300.

Figure 4:
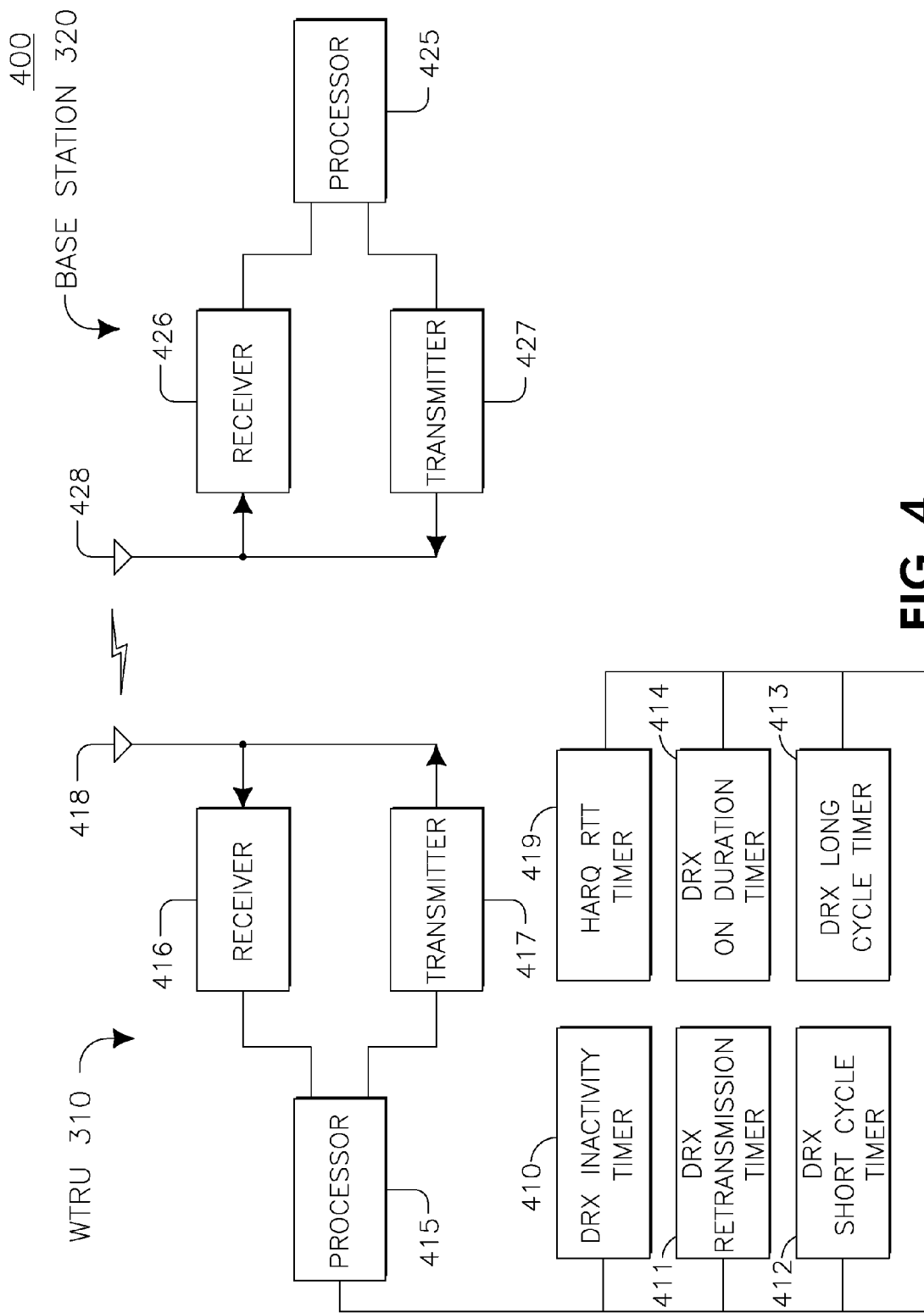
FIG. 4 is a functional block diagram of a WTRU and the base station of FIG. 3.

FIG. 4 is a functional block diagram 400 of the WTRU 310 and the base station 320 of the wireless communication system 300 shown in FIG. 3. As shown in FIG. 4, the WTRU 310 is in communication with the base station 320. In addition to the components that may be found in a typical WTRU, the WTRU 310 includes a processor 415, a receiver 416, a transmitter 417, and an antenna 418. The processor 415 is configured to perform the methods disclosed herein for WTRU behavior during DRX operations, in conjunction with the DRX timers: a DRX inactivity timer 410, a DRX retransmission timer 411, a DRX short cycle timer 412, a DRX long cycle timer 413, a DRX on duration timer 414, and a HARQ RTT timer 419. The receiver 416 and the transmitter 417 are in communication with the processor 415. The antenna 418 is in communication with both the receiver 416 and the transmitter 417 to facilitate the transmission and reception of wireless data.

In addition to the components that may be found in a typical base station, the base station 320 includes a processor 425, a receiver 426, a transmitter 427, and an antenna 428. The processor 425 is configured to allocate the WTRU access to the physical uplink shared channel (PUSCH). The receiver 426 and the transmitter 427 are in communication with the processor 425. The antenna 428 is in communication with both the receiver 426 and the transmitter 427 to facilitate the transmission and reception of wireless data.

In a first embodiment, an uplink periodic transmission (e.g., CQI, PMI, SI and SRS, etc.) may be aligned with the start of a DRX cycle that transmits uplink periodic traffic only during a DRX on duration or active time period for either long or short DRX cycle. An aperiodic uplink traffic, in the form of a channel quality index (CQI) report transmission, is aligned with the start of a DRX cycle.

Figure 5:
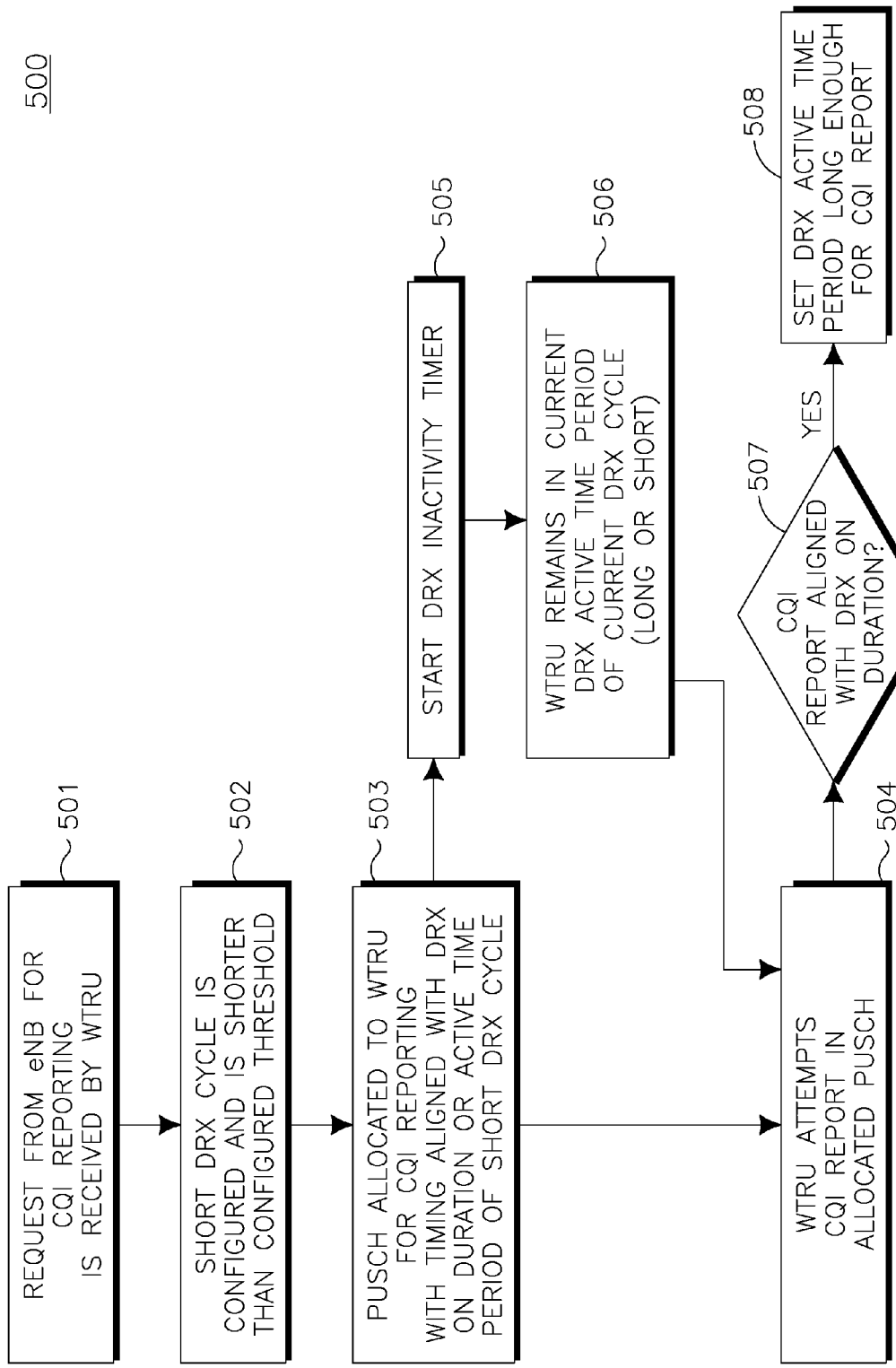
FIG. 5 shows method flow chart for DRX operations related to CQI transmissions.

FIG. 5 shows a flowchart of a method 500 in accordance with the first embodiment in which an LTE enabled WTRU 310 aligns a CQI report transmission to the base station (eNB) 320. At 501, the WTRU 310 receives a request for an aperiodic CQI report from the eNB 320. On the condition 502 that a short DRX cycle is configured and that the short DRX cycle is shorter than a configured threshold, the eNB 320 may allocate at 503 a physical uplink shared channel (PUSCH) for aperiodic CQI reporting during the on duration or active time of the next immediate short DRX cycle. The processor 415 of the WTRU 310 attempts at 504 to send an aperiodic CQI report in an on duration or active time during next immediate short DRX cycle.

Alternatively at 503, the processor 415 may start the DRX inactivity timer 410 at 505. At 506, the processor 415 maintains the DRX active period with either a long DRX cycle or a short DRX cycle, whichever is configured, and transmits the aperiodic CQI report in the allocated PUSCH during the DRX active time. The DRX active time period completes its cycle according to the long DRX cycle or the short DRX cycle, and the DRX inactivity timer 410 expires at the end of the DRX active time period.

At 507, the WTRU processor 415 checks whether the CQI report is can be done within the DRX on duration. If not, then the processor 415 sets aperiodic CQI reporting to be performed during DRX active time, such that the DRX active time is long enough for the WTRU 310 to transmit a CQI report to the eNB 320 and wait for the eNB's request and allocation for an aperiodic CQI report.

Figure 6:
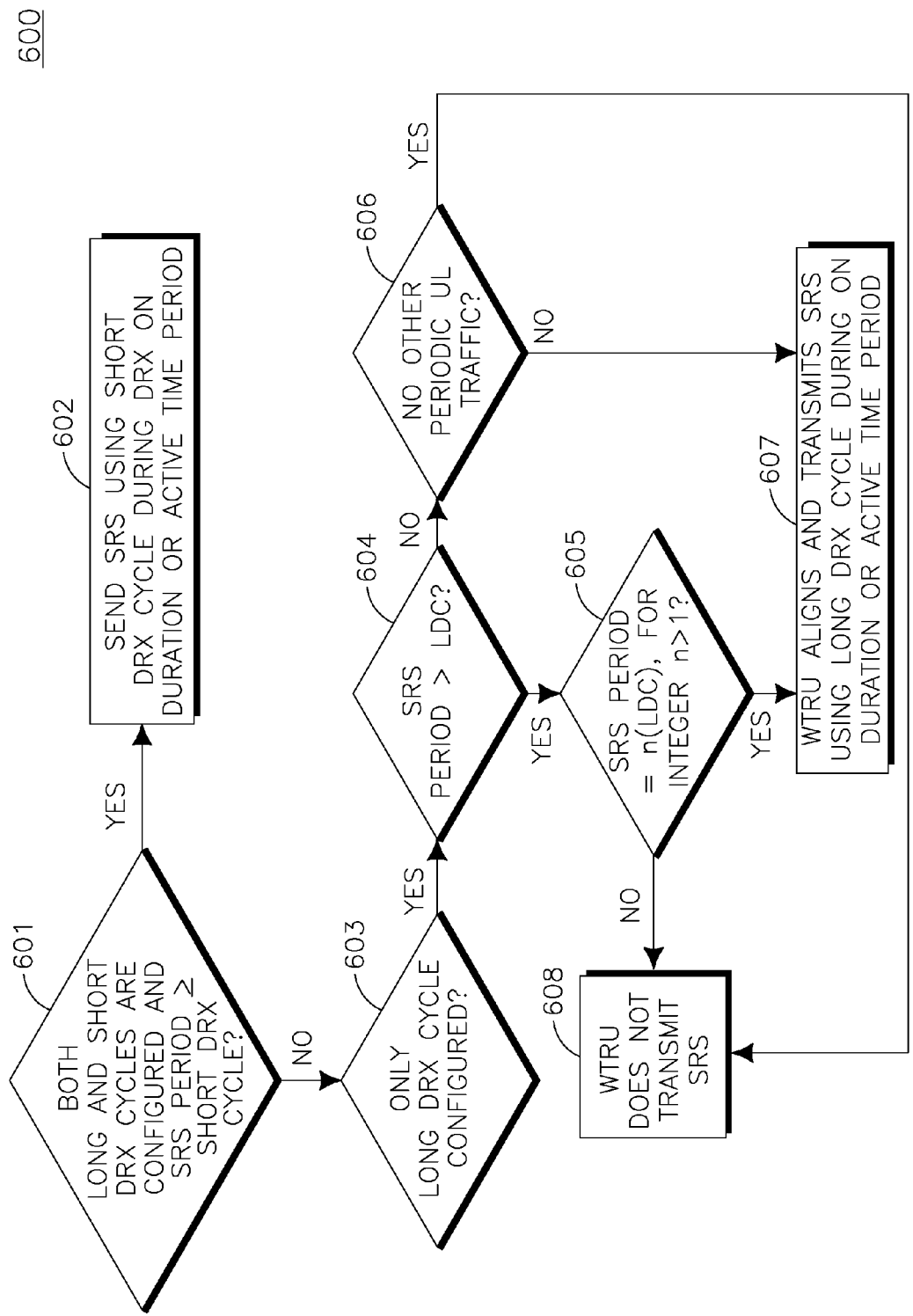
FIG. 6 shows method flow chart for DRX operations related to SRS transmissions.
Figure 7:
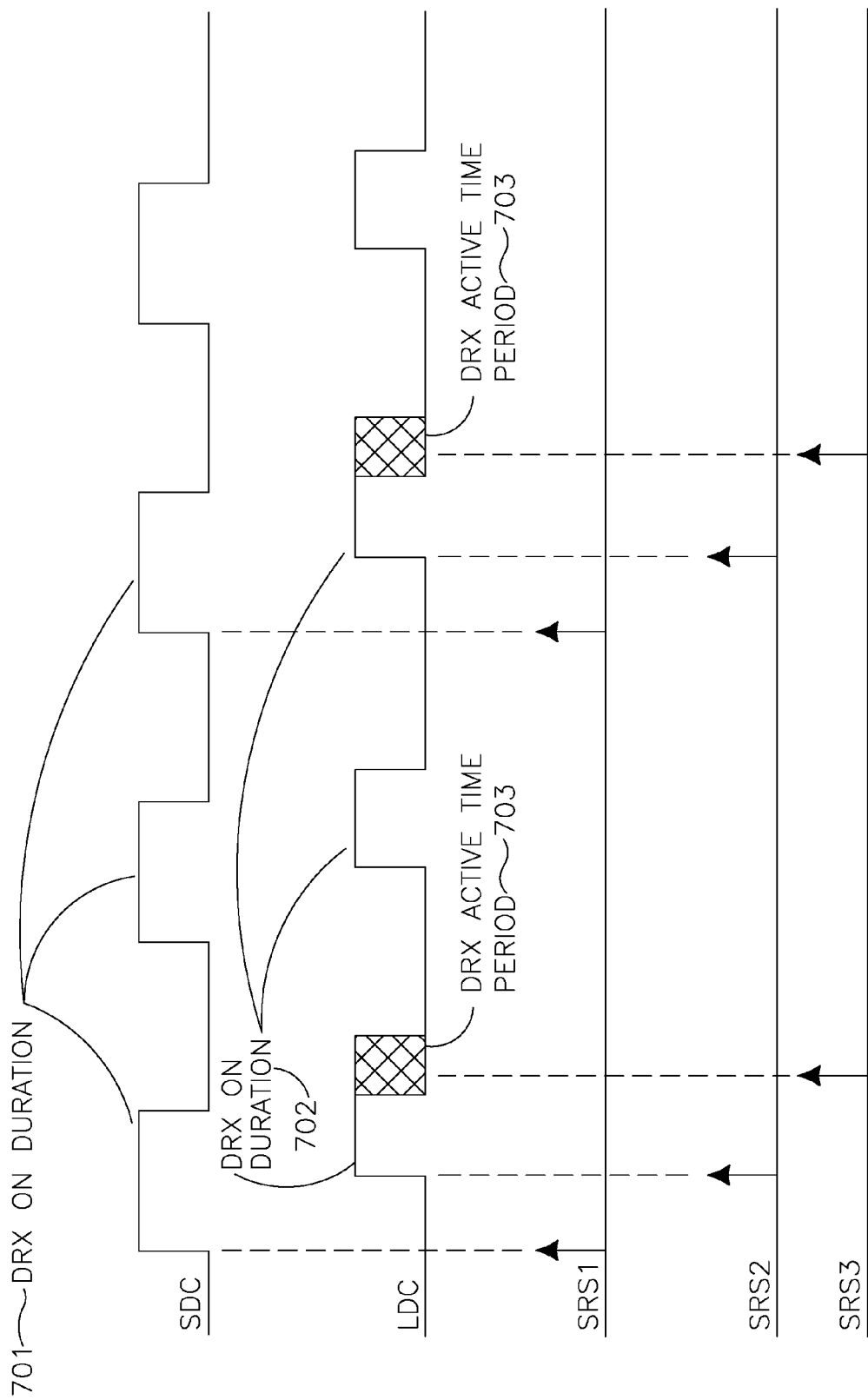
FIG. 7 shows a timing diagram of SRS transmissions of various periodicities with respect to DRX cycle alignment.

FIGS. 6 and 7 illustrate a second embodiment for alignment of sounding reference symbol (SRS) transmissions with a DRX cycle. FIG. 6 shows a flowchart of a method 600, in which SRS transmissions may be aligned with the start of the long DRX cycle or short DRX cycle, whichever is configured.

FIG. 7 shows alignment of SRS transmissions SRS1, SRS2 and SRS3 with DRX on durations 701 of a short DRX cycle (SDC), or DRX on durations 702, DRX active time period 703 of a long DRX cycle (LDC). At 601, if both long and short DRX cycles are configured and SRS period is greater or equal to short DRX cycle, then at 602, the processor 415 aligns the SRS with short DRX cycles and transmits the SRS during on duration or active time of short DRX cycles. As shown by SRS1 in FIG. 7, an SRS may have a transmission period that spans multiple short DRX cycles. In this example, SRS1 has a transmission period of two short DRX cycles (SDC). Alternatively to the condition 601 that both long and short DRX cycles are configured, the processor 415 checks condition 603 for whether only the long DRX cycle is configured. If so, then a condition 604 is checked for whether the SRS transmission period is longer than the long DRX cycle (LDC), and at condition 605, the processor 415 determines whether the SRS transmission period is an integer n multiple of the long DRX cycle:

$$\text{SRS Period} = n(\text{LDC}), \text{ for } n > 1 \qquad \text{Equation 1}$$

Upon affirmative conditions 603, 604 and 605, the processor 415 aligns the SRS transmission with the long DRX cycle, and transmits the SRS during on duration or active time of long DRX cycles at 607. For example, SRS2 and SRS 3 in FIG. 7 have a transmission period equal to 2(LDC), and SRS 2 is aligned with the DRX on duration 702 of the LDC, and SRS3 is aligned with the DRX active time period 703 of the LDC. For the condition that SRS period is not an integer multiple of the LDC at 605, the processor 415 determines at 606 whether some other periodic uplink traffic may be used to maintain timing of the uplink traffic. Upon determining that no such other periodic traffic is present, the processor 415 prohibits the SRS transmission at 608 since a DRX cycle alignment is not possible. Otherwise at condition 606, the processor 415 aligns the uplink timing using the other uplink traffic, and aligns the SRS transmission during DRX on durations or active time of long DRX cycles at 607.

Returning to condition 604, the processor 415 may determine that the SRS transmission period is shorter than the long DRX cycle, and the processor 415 then checks at 606 whether there is no other uplink periodic traffic to maintain the uplink timing advance. With no other periodic uplink traffic, the processor 415 prohibits the SRS transmission at 608 since there is no way to align with the DRX on duration or DRX active time period. Otherwise at condition 606, the processor 415 aligns uplink timing advance using the other periodic uplink traffic, and transmits the SRS during on duration or active time of the long DRX cycle at 607.

In a third embodiment, the WTRU processor 415 controls alignment of the DRX cycle with silence descriptor (SID) packets for voice over internet protocol (VoIP) during a voice silent period. For a downlink, the dynamic scheduling of resource allocations for SIP packets may be aligned with the DRX on duration or active time period whether it is a short or a long DRX cycle, such that scheduling and transmission of SID packets happen in DRX on duration or active time period.

In a first example for this embodiment, in which the WTRU 310 receives downlink SID packets during DRX on duration or active time period, a short DRX cycle does not need to be activated and the WTRU processor 415 activates a long DRX cycle operation. On a condition that a DRX on duration timer 414 or DRX inactivity timer 410 expires following the WTRU 310 having received downlink SID packets during the DRX active time period, the WTRU processor 415 activates a long DRX cycle. This aligns the next DRX on duration or DRX active time period with subsequent SID packets that have a periodic transmission equal to the long DRX cycle. As such, the WTRU 310 does not need to wake up at other moments to monitor and detect SID packets.

Alternatively, as a second example, the WTRU may first enter a short DRX cycle and then enter a long DRX cycle. On a condition that a DRX on duration timer 414 or DRX inactivity timer 410 expires after downlink SID packets is received during this period, the WTRU processor 415 triggers a short DRX cycle. In response to the short DRX cycle timer 412 expiration, the processor 415 starts a long DRX cycle.

Figure 8:
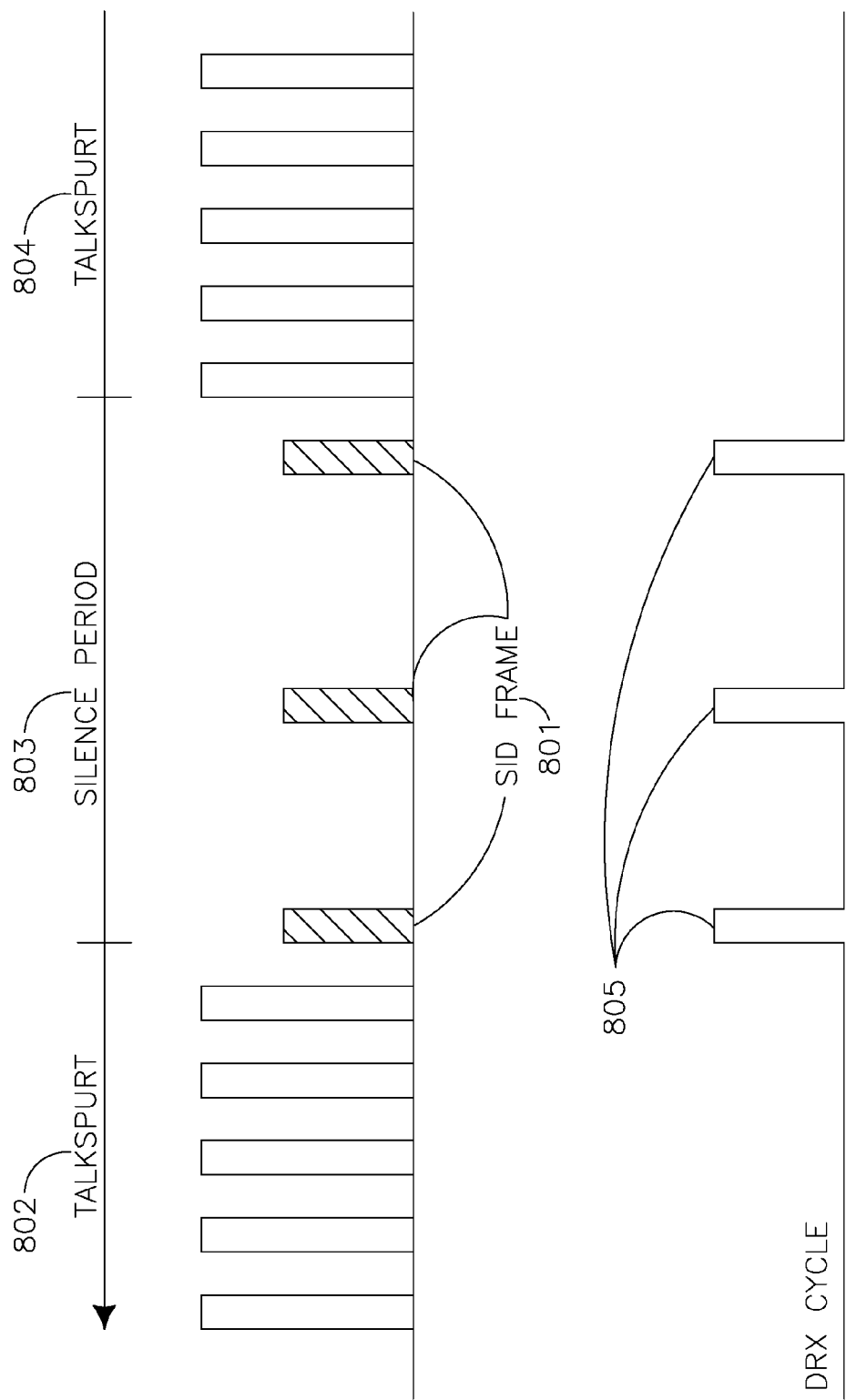
FIG. 8 shows a silence descriptor (SID) transmission during a VoIP silence period with respect to short and long DRX cycle selection.

FIG. 8 illustrates a scheduling request for an uplink SID packet during a VoIP silent period 803 in the uplink between talk spurts 802 and 804. The WTRU 310 may send a scheduling request and buffer status report for an uplink SID packet during DRX on duration or active time period 805 by transmitting uplink SID packets 801 when the DRX inactivity timer 410 is running. In response to the SID scheduling request, the eNB 320 sends a resource allocation for the uplink SID to the WTRU 310 within the same DRX on duration or active time period 805. The WTRU 310 then transmits the uplink SID packet from the allocated resource. While described here in this example as uplink transmission of an SID packet, this procedure may be applied to any uplink transmission.

In a first example, where uplink SID packets 801 are sent by the WTRU 310 during DRX on duration or active time period 805, the short DRX cycle does not need to be activated and the WTRU processor 415 selects the long DRX cycle operation. Thus, on the condition that the DRX on duration timer 414 or DRX inactivity timer 410 expires and the WTRU 310 sends uplink periodic packets (e.g., SID packets) during this period, the WTRU processor 415 activates a long DRX cycle.

Alternatively, on the condition that the DRX on duration timer 414 or DRX inactivity timer 410 expires and SID packets are sent by the WTRU 310 during DRX active time period, the WTRU 310 may enter a short DRX cycle first and then enter a long DRX cycle.

The WTRU 310 may receive a MAC control element from the eNB 320 for terminating any timer related to uplink transmission during the DRX cycle (e.g., the DRX inactivity timer 410, the DRX retransmission timer 411, the DRX short cycle timer 412, the DRX long cycle timer 413, the DRX on duration timer 414). If a resource release message is received from the eNB 320, the WTRU 310 may enter a long DRX cycle.

In a fourth embodiment, operation of the WTRU 310 and interaction of the DRX cycle timers are defined. When the DRX inactivity timer 410, HARQ RTT timer 419 or DRX retransmission timer 411 is still running and a current DRX short cycle timer 412 or DRX long cycle timer 413 expires, the WTRU processor 415 may stop any of these running timers and terminate any on-going downlink and uplink transmissions. The WTRU processor 415 may then start the next DRX cycle timer (DRX short cycle timer 412 or DRX long cycle timer 413). Alternatively, the WTRU processor 415 may keep the DRX inactivity timer 410, HARQ RTT timer 419 or DRX retransmission timer 411 running and finish any on-going downlink and uplink transmission or retransmissions. The DRX on duration timer 414 for the next DRX cycle may be triggered by the processor 415 regardless of whether there are timers from a previous DRX cycle running into the next DRX cycle.

Although features and elements are described above in particular combinations, each feature or element can be used alone without the other features and elements or in various combinations with or without other features and elements. The methods or flow charts provided herein may be implemented in a computer program, software, or firmware incorporated in a computer-readable storage medium for execution by a general purpose computer or a processor. Examples of computer-readable storage mediums include a read only memory (ROM), a random access memory (RAM), a register, cache memory, semiconductor memory devices, magnetic media such as internal hard disks and removable disks, magneto-optical media, and optical media such as CD-ROM disks, and digital versatile disks (DVDs).

Suitable processors include, by way of example, a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Arrays (FPGAs) circuits, any other type of integrated circuit (IC), and/or a state machine.

A processor in association with software may be used to implement a radio frequency transceiver for use in a wireless transmit receive unit (WTRU), user equipment (UE), terminal, base station, radio network controller (RNC), or any host computer. The WTRU may be used in conjunction with modules, implemented in hardware and/or software, such as a camera, a video camera module, a videophone, a speakerphone, a vibration device, a speaker, a microphone, a television transceiver, a hands free headset, a keyboard, a Bluetooth® module, a frequency modulated (FM) radio unit, a liquid crystal display (LCD) display unit, an organic light-emitting diode (OLED) display unit, a digital music player, a media player, a video game player module, an Internet browser, and/or any wireless local area network (WLAN) or Ultra Wide Band (UWB) module.

The invention claimed is:

1. A method implemented by a wireless transmit receive unit (WTRU) for aligning uplink transmissions with a discontinuous reception (DRX) cycle, comprising:
   determining that the DRX cycle is a DRX cycle of a first length;
   receiving an uplink channel allocation for a periodic uplink transmission, the uplink channel allocation having timing aligned with at least one of a DRX on-duration period or a DRX active time period of the DRX cycle of the first length; and
   sending the periodic uplink transmission during at least one of the DRX on-duration period or the DRX active time period.

2. The method as in claim 1, wherein the periodic uplink transmission is a channel quality indicator (CQI) report.

3. The method as in claim 2, further comprising receiving an allocation of a physical uplink shared channel (PUSCH) for the CQI report for the DRX cycle of the first length, on the condition that the DRX cycle of the first length is shorter than a configured threshold.

4. The method as in claim 2, further comprising receiving a CQI request from an eNB and starting an inactivity timer.

5. The method as in claim 2, further comprising setting the DRX active time period to a length sufficient for transmitting the CQI report.

6. The method as in claim 1, wherein the uplink transmission is a sounding reference symbol (SRS) transmission.

7. The method as in claim 6, further comprising comparing the length of the DRX cycle of the first length to a SRS transmission period and sending the SRS transmission on a condition that the SRS transmission period is greater than or equal to the length of the DRX cycle of the first length.

8. The method as in claim 6, further comprising configuring a DRX cycle of a second length that is longer than the first length, determining a SRS transmission period and aligning the SRS with the DRX cycle of the second length, and sending the SRS transmission during a DRX active time period on a condition that the SRS transmission period equals an integer multiple of the length of the DRX cycle of the second length.

9. A wireless transmit/receive unit (WTRU), comprising:
a processor configured, at least in part, to:
determine that a discontinuous reception (DRX) cycle is a DRX cycle of a first length;
receive an uplink channel allocation for a periodic uplink transmission, the uplink channel allocation having timing aligned with at least one of a DRX on-duration period or a DRX active time period of the DRX cycle of the first length; and
send the periodic uplink transmission during at least one of the DRX on-duration period or the DRX active time period.

10. The WTRU as in claim 9, wherein the periodic uplink transmission is a channel quality indicator (CQI) report.

11. The WTRU as in claim 10, further comprising receiving an allocation of a physical uplink shared channel (PUSCH) for the CQI report for the DRX cycle of the first length, on the condition that the DRX cycle of the first length is shorter than a configured threshold.

12. The WTRU as in claim 10, further comprising receiving a CQI request from an eNB and starting an inactivity timer.

13. The WTRU as in claim 10, further comprising setting the DRX active time period to a length sufficient for transmitting the CQI report.

14. The WTRU as in claim 9, wherein the uplink transmission is a sounding reference symbol (SRS) transmission.

15. The WTRU as in claim 14, wherein the processor is further configured to configure a DRX cycle of a second length, determine a SRS transmission period and align the SRS with the DRX cycle of the second length, and transmit the SRS during a DRX active time period on a condition that the SRS transmission period equals an integer multiple of the length of the DRX cycle of the second length.

16. The WTRU as in claim 14, wherein the processor is further configured to determine a SRS transmission period, compare the DRX cycle of the first length to the SRS transmission period, and send the SRS transmission on a condition that the DRX cycle of the first length is greater than or equal to the SRS transmission period.

* * * * *